United States Patent
DeLuca (10) Patent No.: US 11,829,166 B2
(45) Date of Patent: Nov. 28, 2023

(54) IMAGE ANALYSIS FOR TEMPERATURE MODIFICATION

(71) Applicant: International Business Machines Corporation, Armonk, NY (US)

(72) Inventor: Lisa Seacat DeLuca, Bozeman, MT (US)

(73) Assignee: International Business Machines Corporation, Armonk, NY (US)

(*) Notice: Subject to any disclaimer, the term of this patent is extended or adjusted under 35 U.S.C. 154(b) by 138 days.

(21) Appl. No.: 17/124,970

(22) Filed: Dec. 17, 2020

(65) Prior Publication Data

US 2022/0197319 A1 Jun. 23, 2022

(51) Int. Cl.
*G05D 23/32* (2006.01)
*F24F 110/12* (2018.01)
*G05D 23/19* (2006.01)
*G05D 23/12* (2006.01)
*F24F 120/14* (2018.01)
*F24F 120/10* (2018.01)

(52) U.S. Cl.
CPC ........... *G05D 23/32* (2013.01); *G05D 23/121* (2013.01); *G05D 23/1917* (2013.01); *F24F 2110/12* (2018.01); *F24F 2120/10* (2018.01); *F24F 2120/14* (2018.01)

(58) Field of Classification Search
CPC .. G05D 23/32; G05D 23/121; G05D 23/1917; F24F 2120/10; F24F 2110/12; F24F 2120/14
See application file for complete search history.

(56) References Cited

U.S. PATENT DOCUMENTS

| 7,702,421 B2 | 4/2010 | Sullivan et al. |
| 8,116,912 B2 | 2/2012 | Chao et al. |
| (Continued) | | |

FOREIGN PATENT DOCUMENTS

| CN | 100565025 C | 12/2009 | |
| CN | 107576022 B | * 1/2018 | .............. F24F 11/65 |
| (Continued) | | | |

OTHER PUBLICATIONS

Grauel, Andreas; DE-10320829-B4, Mar. 2019, German patent document translation (Year: 2019).*

(Continued)

*Primary Examiner* — Kenneth M Lo
*Assistant Examiner* — Jonathan Michael Skrzycki
(74) *Attorney, Agent, or Firm* — Kimberly S. Zillig (57) ABSTRACT

A method can include obtaining a set of images of a set of occupants located in an interior environment. The interior environment can have a first temperature. The method can include identifying, based on the set of images, a set of occupant characteristics corresponding to the set of occupants. The method can include obtaining a second temperature of an external environment. The method can include generating, by comparing the set of occupant characteristics to the second temperature, a discrepancy factor. The method can include determining that the discrepancy factor exceeds a threshold. The method can include initiating, in response to the determining that the discrepancy factor exceeds the threshold, a modification of the first temperature.

13 Claims, 5 Drawing Sheets

(56) References Cited

U.S. PATENT DOCUMENTS

| | | | |
|---|---|---|---|
| 2011/0205371 A1 | 8/2011 | Nagata | |
| 2013/0334194 A1 | 12/2013 | Chen | |
| 2015/0025738 A1* | 1/2015 | Tumas | B60H 1/00742 701/36 |
| 2015/0028114 A1 | 1/2015 | Rosen | |
| 2015/0247647 A1* | 9/2015 | Kusukame | G06K 9/00362 700/276 |
| 2018/0363930 A1 | 12/2018 | Delaney et al. | |
| 2021/0131693 A1* | 5/2021 | Rucco | F24F 11/56 |
| 2021/0260958 A1* | 8/2021 | Nilsson | G01K 13/00 |

FOREIGN PATENT DOCUMENTS

| | | | |
|---|---|---|---|
| DE | 102009058163 A1 | 6/2011 | |
| DE | 10320829 B4 * | 3/2019 | B60H 1/00 |

OTHER PUBLICATIONS

Unknown, "Air-conditioning: Why might women feel temperature differently from men?", Aug. 4, 2015, 10 pages.
Hodson, H., "Smart clothes adapt so you are always the right temperature", Jan. 22, 2016, 7 pages.
Unknown, "Browse Articles", Nature Climate Change, printed Aug. 20, 2020, 2 pages.
Aron, J., "Keep snuggly warm with self-heating nanowire clothes", Dec. 16, 2014, 5 pages.
Anonymous, "Method and apparatus for positional dynamic optimized heating/cooling",An IP.com Prior Art Database Technical Disclosure, IP.com No. IPCOM000200054D, IP.com Electronic Publication Date: Sep. 24, 2010, 3 pages.
Mell et al., "The NIST Definition of Cloud Computing", Recommendations of the National Institute of Standards and Technology, Sep. 2011, 7 pages.

* cited by examiner

IMAGE ANALYSIS FOR TEMPERATURE MODIFICATION

BACKGROUND

The present disclosure relates to temperature control, and more specifically, to modifying a temperature of an interior environment.

Heating, ventilation, and air conditioning ("HVAC") systems can be employed to modify a temperature of an interior environment. Such systems can modify the temperature based on temperature measurements of the interior environment and can function to maintain a preselected temperature within the interior environment.

SUMMARY

According to embodiments of the present disclosure, a method can include obtaining a set of images of a set of occupants located in an interior environment. The interior environment can have a first temperature. The method can include identifying a set of occupant characteristics corresponding to the set of occupants. The set of occupant characteristics can be based on the set of images. The method can include obtaining a second temperature of an external environment. The method can include generating, by comparing the set of occupant characteristics to the second temperature, a discrepancy factor. The method can include determining that the discrepancy factor exceeds a threshold. The method can include initiating a modification of the first temperature. The initiating can be in response to the determining that the discrepancy factor exceeds the threshold.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to temperature control; more particular aspects relate to image analysis for temperature modification. While the present disclosure is not necessarily limited to such applications, various aspects of the disclosure may be appreciated through a discussion of various examples using this context.

Conditioning devices, such as heaters, fans, and/or air conditioners, can be configured to maintain a target temperature within an interior environment, such as an office space of an office building. While these conditioning devices can be designed to efficiently maintain the target temperature, in some instances, the target temperature can cause discomfort to occupants of the interior environment. For example, in some instances, an exterior environment temperature (e.g., an outdoor temperature in a city) can exceed 38° C. during the summer. To compensate for such a high outdoor temperature, a facilities manager of an office building in the city can select a target temperature of 20° C. for the office building. In this example, the target temperature can be uncomfortably cold for a plurality of occupants of the office building. As a result, the occupants in this example can take adaptive steps to improve their comfort level, such as wearing clothing and/or accessories (e.g., coats, jackets, gloves, and/or sweaters) typically associated with a different season and designed for temperatures inconsistent with the outdoor temperature. In some instances, such adaptive steps can include occupants utilizing space heaters in their workspaces. Thus, in this example, the target temperature can result in wasted energy expended for heating and cooling as well as discomfort to occupants of the office building.

To address these and other challenges, embodiments of the present disclosure include a temperature modification system. In some embodiments, the temperature modification system can employ image analysis to tailor a temperature of an interior environment to occupants of the interior environment. Particularly, in some embodiments, through image analysis, the temperature modification system can identify characteristics, such as clothing classifications, of a set of occupants in an interior environment. The temperature modification system can compare such occupant characteristics to attributes of an exterior environment, such as an outdoor temperature, to identify discrepancies. In response to determining that such discrepancies exceed a threshold, the temperature modification system can modify a temperature of the interior environment.

Accordingly, embodiments of the present disclosure can improve heating and/or cooling efficiency by reducing instances of excessive heating and/or cooling of interior environments, such as office workspaces. Embodiments of the present disclosure can intermittently or periodically modify a temperature of an interior environment as disclosed herein; thus, embodiments of the present disclosure can accommodate changed circumstances, such as a changed occupant capacity of the interior environment. Embodiments of the present disclosure can accurately improve a comfort level of occupants of an interior environment by modifying a temperature based on observed characteristics of such occupants.

Figure 1:
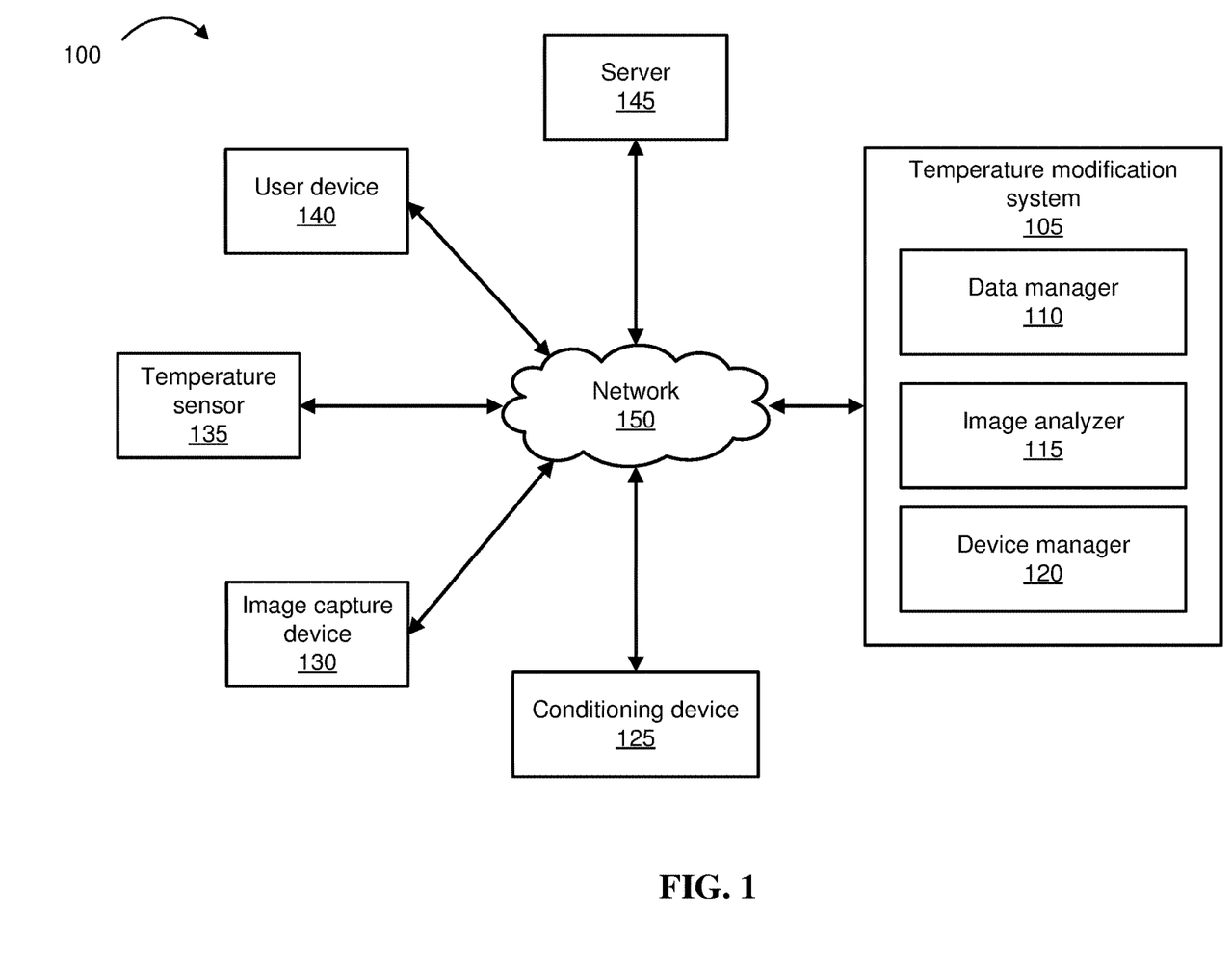
FIG. 1 depicts an example computing environment having a temperature modification system, in accordance with embodiments of the present disclosure.

Turning to the figures, FIG. 1 illustrates a computing environment 100 that includes one or more of each of a temperature modification system 105, a conditioning device 125, an image capture device 130, a temperature sensor 135, a user device 140, a server 145, and/or a network 150. In some embodiments, at least one temperature modification system 105, conditioning device 125, image capture device 130, temperature sensor 135, user device 140, and/or server 145 can exchange data with at least one other through the at least one network 150. One or more of each of the temperature modification system 105, conditioning device 125, image capture device 130, temperature sensor 135, user device 140, server 145, and/or network 150 can include a computer system, such as the computer system 301 discussed with respect to FIG. 3.

In some embodiments, the temperature modification system 105 can be included in software installed on a computer system of at least one of the conditioning device 125, image capture device 130, user device 140, and/or server 145. For example, in some embodiments, the temperature modification system 105 can be included as a plug-in software component of software installed on a user device 140. The temperature modification system 105 can include program instructions implemented by a processor, such as a processor of a user device 140, to perform one or more operations discussed with respect to FIG. 2.

In some embodiments, the temperature modification system 105 can include one or more modules, such as a data manager 110, image analyzer 115, and/or device manager 120. In some embodiments, the data manager 110, image analyzer 115, and/or device manager 120 can be integrated into a single module. In some embodiments, the data manager can obtain, interpret, analyze, store, and/or initiate storage of data, such as image data from image capture devices 130. In some embodiments, the image analyzer 115 can employ image analysis technology to identify features of one or more images obtained by the temperature modification system 105. In some embodiments, the device manager 120 can issue commands to one or more devices, such as conditioning devices 125. In some embodiments, one or more of the data manager 110, image analyzer 115, and/or device manager 120 can include program instructions implemented by a processor, such as a processor of a user device 140, to perform one or more operations discussed with respect to FIG. 2. For example, in some embodiments, the data manager 110 can include program instructions to perform operations 210 and 230-260. In some embodiments, the image analyzer 115 can include program instructions to perform operation 220. In some embodiments, device manager 120 can include program instructions to perform operation 270. In some embodiments, the temperature modification system 105 can automatically and intermittently perform one or more operations discussed with respect to FIG. 2.

In some embodiments, the one or more conditioning devices 125 can include devices configured to heat or cool an interior environment. For example, in some embodiments, conditioning devices 125 can include one or more heaters, fans, and/or air-conditioners. In some embodiments, conditioning devices 125 can include one or more HVAC systems. In some embodiments, conditioning devices 125 can include one or more vents or windows configured to be controlled remotely (e.g., opened and/or closed by commands transmitted across network 150). In some embodiments, conditioning devices 125 can be configured to maintain an interior environment at a preselected temperature (i.e., a target temperature).

In some embodiments, image capture devices 130 can include one or more cameras configured to obtain images, such as digital photographs, of an interior environment and/or occupants of an interior environment. In some embodiments, temperature sensors 135 can include one or more devices configured to measure a temperature of an interior environment and/or an exterior environment. In some embodiments, temperature sensors 135 can be integrated into conditioning devices 125.

In some embodiments, user devices 140 can include one or more computers, mobile devices, and/or wearable devices. For example, in some embodiments, user devices 140 can include a smart watch (e.g., a wearable computer in the form of a watch), mobile phone, tablet, laptop computer, and the like. In some embodiments, user devices 140 can be configured to measure a parameter such as a user's body temperature and/or store information about a user's activities and/or purchase history.

In some embodiments, the one or more servers 145 can include one or more web servers. In some embodiments, the one or more servers 145 can include information such as temperature and/or weather data. In some embodiments, the one or more servers 145 can include information such as clothing classifications and/or specifications.

In some embodiments, the network 150 can be a wide area network (WAN), a local area network (LAN), the internet, or an intranet. In some embodiments, the network 150 can be substantially similar to, or the same as, cloud computing environment 50 discussed with respect to FIG. 4.

Figure 2:
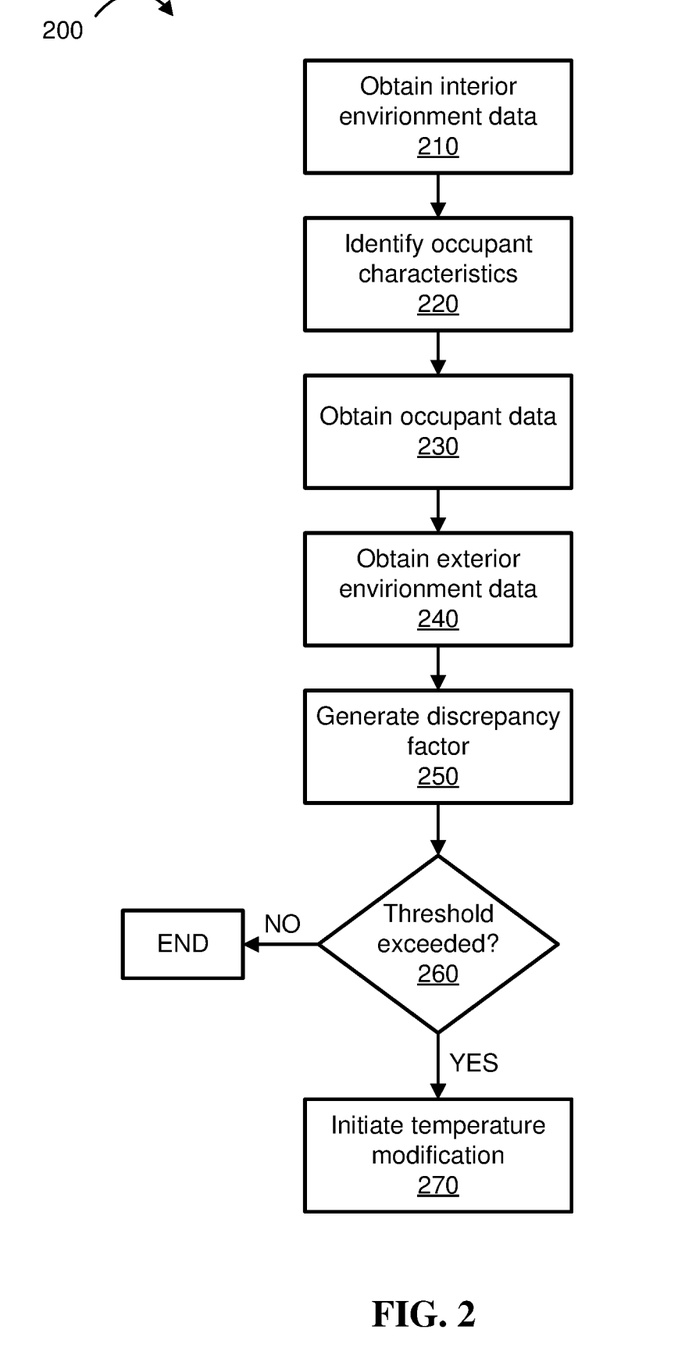
FIG. 2 depicts a flowchart of an example method for performing temperature modification, in accordance with embodiments of the present disclosure.

FIG. 2 illustrates a flowchart of an example method 200 for performing temperature modification, in accordance with embodiments of the present disclosure. Method 200 can be performed by a temperature modification system, such as the temperature modification system 105 discussed with respect to FIG. 1.

Referring back to FIG. 2, in operation 210, the temperature modification system can obtain interior environment data. Interior environment data can refer to information corresponding to an interior environment, such as a building and/or a space (e.g., one or more rooms) within a building. In some embodiments, interior environment data can include information such as images of the interior environment and/or occupants of the interior environment. For example, in some embodiments, interior environment data can include a set of digital images showing a plurality of employees in a workspace of an office building. In some embodiments, interior environment data can include information such as a temperature of the interior environment and/or a location of the interior environment. In some embodiments, the temperature modification system can obtain interior environment data from one or more devices discussed with respect to FIG. 1 (e.g., conditioning devices 125, image capture devices 130, temperature sensors 135, user devices 140, and/or servers 145).

Referring back to FIG. 2, in operation 220, the temperature modification system can identify a set of occupant characteristics. Occupant characteristics can refer to information about one or more occupants of the interior environment; such information can be obtained through image analysis of one or more images obtained in operation 210. Occupant characteristics can include information such as a number of occupants present in an interior environment, types of clothing worn by the one or more occupants, and/or physical activities of the one or more occupants.

For example, in some embodiments, the temperature modification system can apply image analysis to identify a set of clothing classifications corresponding to one or more occupants of the interior environment. A clothing classification can indicate a type and/or category of clothing or accessory worn by an occupant of the interior environment. For example, in some embodiments, clothing classifications can include categories such as outerwear (e.g., jackets and/or coats), sweaters, short sleeves, long sleeves, shorts, seasonal accessories (e.g., gloves, hats, and/or scarves), and the like. Thus, in an example, the temperature modification system can identify, by image analysis of images obtained in operation 210, that 20 occupants are present in an office space, that 3 of the occupants are wearing jackets, and that 12 of the occupants are wearing sweaters.

In some embodiments, operation 220 can include the temperature modification system assigning a set of temperature ratings that correspond to the set of clothing classifications. In some embodiments, a temperature rating can indicate an approximate ambient temperature for which a type and/or category of clothing or accessory was designed. For example, in some embodiments, a temperature rating can include a manufacturer-specified ambient temperature for which a garment, such as a jacket, was designed. In some embodiments, a temperature rating can indicate a season (e.g., fall, winter, spring, summer), and/or an average temperature of such a season, that can be associated with a type and/or category of clothing or accessory. For example, in some embodiments, the temperature modification system can associate a sweater worn by an occupant with a winter season, and the winter season can be associated with a local average ambient temperature of approximately 0° C. In some embodiments, a temperature rating can indicate an approximate average temperature deemed comfortable to an average wearer of the garment.

In some embodiments, the temperature modification system can assign the set of temperature ratings based on stored clothing classification data. For example, in some embodiments, the temperature modification system can include a database of predetermined correlations between clothing classifications and temperature ratings. In these embodiments, the temperature modification system can assign a temperature rating by selecting, from such a database, a temperature rating corresponding to a garment and/or clothing classification. In some embodiments, the temperature modification system can obtain such stored clothing classification data from one or more sources, such as user devices 140 and/or servers, 145, FIG. 1.

In some embodiments, operation 220 can include the temperature modification system identifying, by image analysis, physical activities of the one or more occupants. For example, in some embodiments, the temperature modification system can identify whether an occupant is consuming a hot food or beverage, such as a soup, tea, or coffee, or consuming a cold beverage, such as a canned or bottled soda. In some embodiments, the temperature modification system can identify movement, such as an occupant entering and/or leaving a space. In some embodiments, the temperature modification system can adjust a target temperature for the interior environment based, at least in part, on the identified physical activities.

In some embodiments, in operation 230, the temperature modification system can obtain occupant data of one or more occupants of the interior environment. Occupant data can include information obtained through one or more user devices, such as user devices 140, FIG. 1, following valid consent of the one or more occupants. For example, in some embodiments occupant data can include an occupant's temperature measured by the occupant's smart watch. In some embodiments, occupant data can include calendar data from an occupant's computer indicating that the occupant has just returned from a workout. In some embodiments, occupant data can include a purchase history from an occupant's smart phone indicating that the occupant has just returned from purchasing a large cup of tea. In some embodiments, the temperature modification system can adjust a target temperature for the interior environment based, at least in part, on the occupant data.

In operation 240, the temperature modification system can obtain exterior environment data. Exterior environment data can refer to information about an exterior environment that is associated with the interior environment. In some embodiments, exterior environment data can include information regarding a temperature, weather forecast, and/or season corresponding to an exterior environment. For example, in some embodiments, an exterior environment can include an outdoor space in a city where an interior environment (e.g., an office building) is located. In this example, exterior environment data can include a current outside temperature and/or a current season (e.g., spring, summer, fall, or winter). In some embodiments, the temperature modification system can obtain exterior environment data from one or more sources (e.g., temperature sensors 135, user devices 140, servers 145, FIG. 1).

In operation 250, the temperature modification system can generate a discrepancy factor. In some embodiments, a discrepancy factor can indicate a difference between occupant characteristics identified in operation 220 and exterior environment data obtained in operation 240. In some embodiments, a discrepancy factor can be a numeric value. For example, in some embodiments, the temperature modification system can generate a discrepancy factor that represents a quantity of occupants of an interior environment who are wearing garments associated with a season that does not match a current season. For example, in some embodiments, the temperature modification system can generate a discrepancy factor of 60%, which can represent a quantity of occupants wearing garments having a winter temperature rating when a current season is summer. In another example, in some embodiments, the temperature modification system can generate a discrepancy factor by calculating an average difference between a set of temperature ratings assigned in operation 220 and an outside temperature obtained in operation 240. For example, in some embodiments, an interior environment can include 10 occupants. In this example, the temperature modification system can assign 10 respective temperature ratings ($TR_1$, $TR_2$, $TR_3$ ... $TR_{10}$) to garments worn by each of the 10 occupants. Continuing with this example, the temperature modification system can calculate a discrepancy factor (DF) as an average of the absolute values of the differences between each of the 10 temperature ratings and an outside temperature ($T_{out}$):

$$DF=(|TR_1-T_{out}|+|TR_2-T_{out}|+|TR_3-T_{out}|+ \ldots |TR_{10}-T_{out}|) \div 10.$$

In operation 260, the temperature modification system can determine whether a discrepancy factor generated in operation 250 exceeds a threshold. For example, in some embodiments, the temperature modification system can determine if a percentage of occupants wearing garments associated with a season that does not match a current season exceeds a threshold of 50%. In another example, in some embodiments, the temperature modification system can determine if an average of a set of differences between a set of temperature ratings and an outside temperature exceeds a threshold of 10° C. In some embodiments, the threshold can be selected by an entity such as a programmer of the temperature modification system, a user, such as a facilities manager, or by the temperature modification system itself.

In operation 260, if the temperature modification system determines that the threshold is exceeded, then the temperature modification system can proceed to operation 270. Otherwise, if the temperature modification system determines that the threshold is not exceeded, then method 200 can end.

In operation 270, in response to determining that a threshold is exceeded, the temperature modification system can initiate a temperature modification. In some embodiments, initiating a temperature modification can include the temperature modification system issuing a command to a conditioning device (e.g., conditioning device 125, FIG. 1) to increase or decrease a temperature of the interior environment. In some embodiments, initiating a temperature modification can include the temperature modification system issuing a notification to a user device, such as a computer of a facilities manager. Such a notification can indicate that a temperature of the interior environment should be increased or decreased. For example, in some embodiments, the temperature modification system can determine to increase a temperature of the interior environment in response to a discrepancy factor indicating that occupants are wearing garments associated with fall or winter when the current season is summer. In some embodiments the temperature modification system can determine to decrease a temperature of the interior environment in response to a discrepancy factor indicating that occupants are wearing garments associated with spring or summer when the current season is winter.

In some embodiments, operation 270 can include the temperature modification system generating an adjusted target temperature (e.g., an adjusted temperature to be maintained within an interior environment). For example, in some embodiments, a conditioning device can be configured to maintain an interior environment at a target temperature of 20° C. In this example, the target modification system can determine, through the operations discussed above, to increase a temperature of the interior environment. The target modification system can initiate such an increase by generating an adjusted target temperature, such as 23° C. In some embodiments, the adjusted target temperature can account for physical activities of one or more occupants. For example, in a case of a temperature modification system generating an increased target temperature for an occupant's office, the target temperature can be increased to a lesser degree in view of information indicating that the occupant is consuming a hot food or beverage and/or has just returned from a workout. In this way, the temperature modification system can closely tailor a temperature of an interior environment to one or more occupants. In some embodiments, operation 270 can include the temperature modification system transmitting an adjusted target temperature to a user device, such as a computer of a facilities manager. In some embodiments, operation 270 can include the temperature modification system transmitting the adjusted target temperature to a conditioning device for implementation.

In some embodiments, operation 270 can include the temperature modification system receiving feedback from a user, such as a facilities manager. For example, in some embodiments, the temperature modification system can transmit information such as the discrepancy factor to a user device, such as a mobile phone of a facilities manager. Continuing with this example, the temperature modification system can request a confirmation message from the user device prior to issuing a command to modify a temperature. In these embodiments, the temperature modification system can modify the temperature in response to receiving such a confirmation message. In this way, embodiments of the present disclosure can employ reinforcement learning to improve accuracy in initiating temperature modifications.

Figure 3:
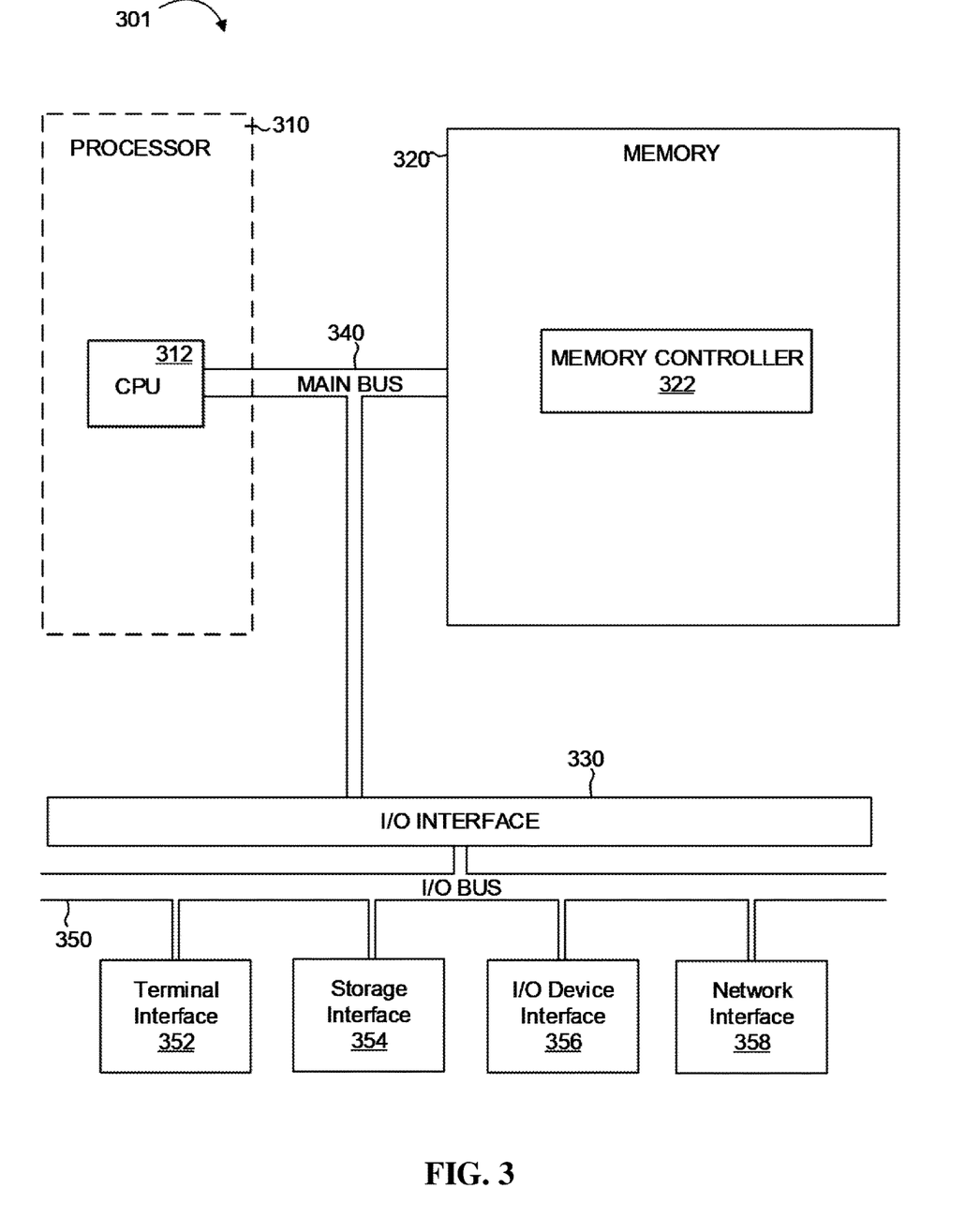
FIG. 3 depicts the representative major components of a computer system that can be used in accordance with embodiments of the present disclosure.

FIG. 3 depicts the representative major components of an exemplary Computer System 301 that can be used in accordance with embodiments of the present disclosure. The particular components depicted are presented for the purpose of example only and are not necessarily the only such variations. The Computer System 301 can comprise a Processor 310, Memory 320, an Input/Output Interface (also referred to herein as I/O or I/O Interface) 330, and a Main Bus 340. The Main Bus 340 can provide communication pathways for the other components of the Computer System 301. In some embodiments, the Main Bus 340 can connect to other components such as a specialized digital signal processor (not depicted).

The Processor 310 of the Computer System 301 can be comprised of one or more CPUs 312. The Processor 310 can additionally be comprised of one or more memory buffers or caches (not depicted) that provide temporary storage of instructions and data for the CPU 312. The CPU 312 can perform instructions on input provided from the caches or from the Memory 320 and output the result to caches or the Memory 320. The CPU 312 can be comprised of one or more circuits configured to perform one or more methods consistent with embodiments of the present disclosure. In some embodiments, the Computer System 301 can contain multiple Processors 310 typical of a relatively large system. In other embodiments, however, the Computer System 301 can be a single processor with a singular CPU 312.

The Memory 320 of the Computer System 301 can be comprised of a Memory Controller 322 and one or more memory modules for temporarily or permanently storing data (not depicted). In some embodiments, the Memory 320 can comprise a random-access semiconductor memory, storage device, or storage medium (either volatile or non-volatile) for storing data and programs. The Memory Controller 322 can communicate with the Processor 310, facilitating storage and retrieval of information in the memory modules. The Memory Controller 322 can communicate with the I/O Interface 330, facilitating storage and retrieval of input or output in the memory modules. In some embodiments, the memory modules can be dual in-line memory modules.

The I/O Interface 330 can comprise an I/O Bus 350, a Terminal Interface 352, a Storage Interface 354, an I/O Device Interface 356, and a Network Interface 358. The I/O Interface 330 can connect the Main Bus 340 to the I/O Bus 350. The I/O Interface 330 can direct instructions and data from the Processor 310 and Memory 320 to the various interfaces of the I/O Bus 350. The I/O Interface 330 can also direct instructions and data from the various interfaces of the I/O Bus 350 to the Processor 310 and Memory 320. The various interfaces can comprise the Terminal Interface 352, the Storage Interface 354, the I/O Device Interface 356, and the Network Interface 358. In some embodiments, the various interfaces can comprise a subset of the aforementioned interfaces (e.g., an embedded computer system in an industrial application may not include the Terminal Interface 352 and the Storage Interface 354).

Logic modules throughout the Computer System 301—including but not limited to the Memory 320, the Processor 310, and the I/O Interface 330—can communicate failures and changes to one or more components to a hypervisor or operating system (not depicted). The hypervisor or the operating system can allocate the various resources available in the Computer System 301 and track the location of data in Memory 320 and of processes assigned to various CPUs 312. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
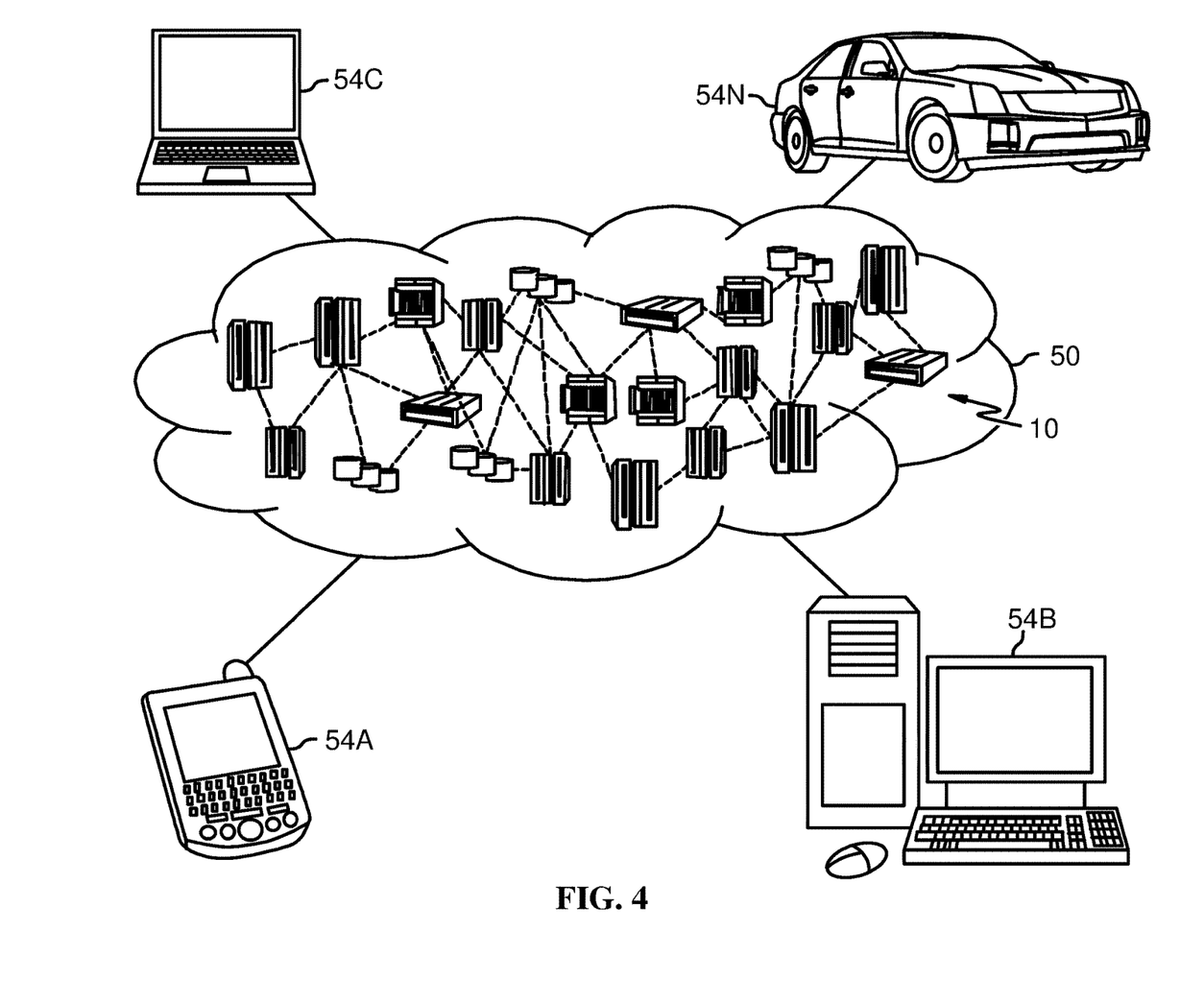
FIG. 4 depicts a cloud computing environment according to embodiments of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
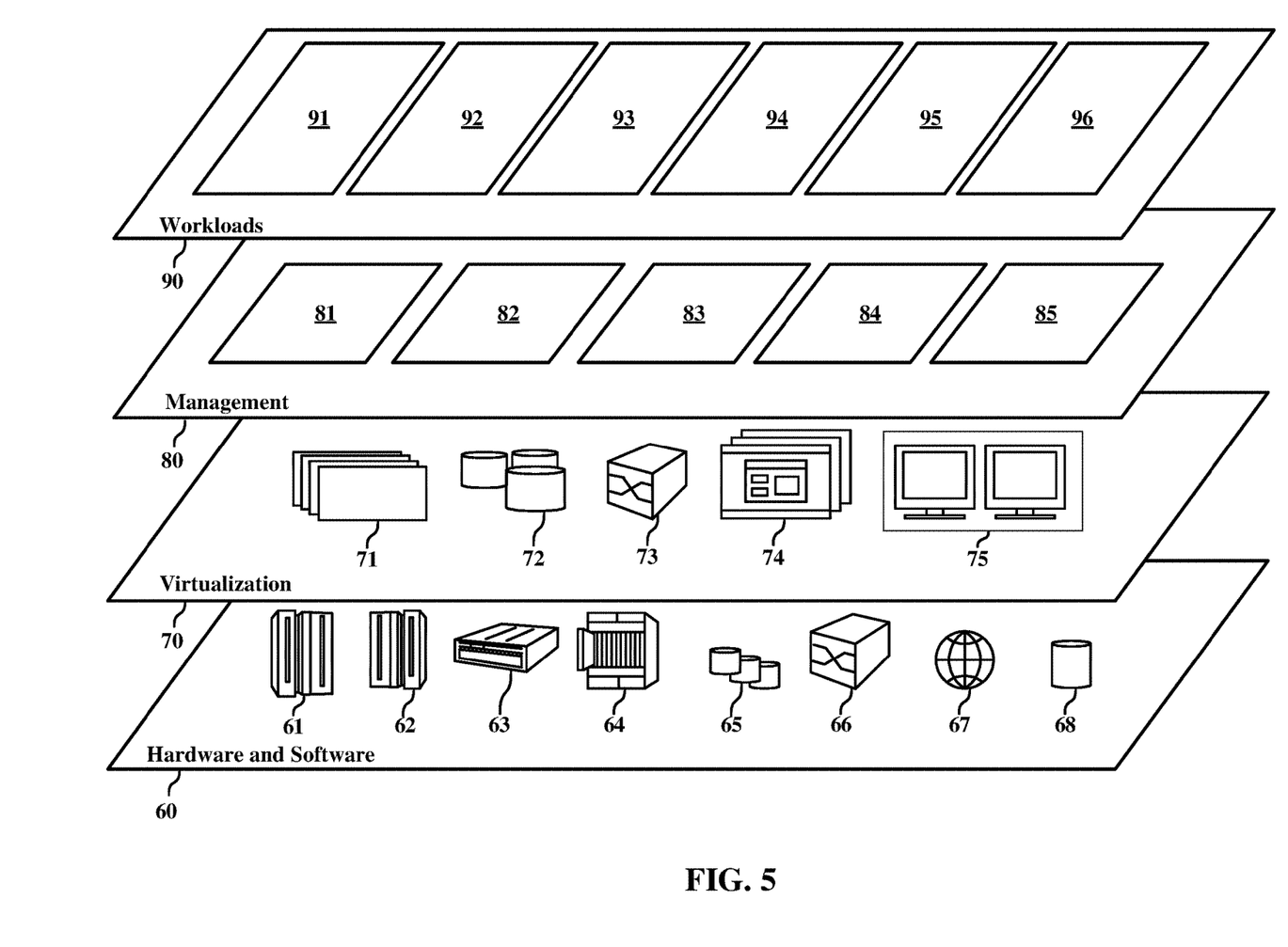
FIG. 5 depicts abstraction model layers according to embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and temperature modification logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining a set of images of a set of occupants located in an interior environment;
   measuring a first temperature of the interior environment using one or more devices configured to measure the first temperature;
   identifying, based on the set of images, a set of occupant characteristics corresponding to the set of occupants;
   assigning a set of temperature ratings corresponding, respectively, to the set of occupant characteristics;
   obtaining data about an external environment, including a second temperature;
   generating a discrepancy factor that is a numeric value that indicates an average difference between the set of temperature ratings and the external environment data;
   determining that the discrepancy factor exceeds a threshold; and
   initiating, in response to the determining that the discrepancy factor exceeds the threshold, a modification of the first temperature by issuing a command to a conditioning device to modify the first temperature,
   wherein the identifying the set of occupant characteristics comprises identifying a set of clothing classifications corresponding to the set of occupants, wherein the set of temperature ratings corresponds, respectively, to the set of clothing classifications, and wherein the discrepancy factor indicates an average of absolute values of differences between each of the set of temperature ratings and the second temperature.

2. The computer-implemented method of claim 1, wherein the set of temperature ratings comprises a first temperature rating and a second temperature rating;
   wherein the discrepancy factor is generated by calculating an average of a set of values, the set of values comprising:
   a first difference between the first temperature rating and the second temperature; and
   a second difference between the second temperature rating and the second temperature.

3. The computer-implemented method of claim 1, further comprising identifying, based on the set of images, a set of physical activities of the set of occupants; and
   adjusting a target temperature of the interior environment based on the set of physical activities.

4. The computer-implemented method of claim 3, wherein the set of physical activities is selected from the group consisting of movement, food consumption, and beverage consumption.

5. The method of claim 1, wherein the one or more devices configured to measure the first temperature includes a temperature sensor.

6. A system comprising:
   at least one conditioning device configured to maintain or modify a temperature within an interior environment;
   at least one image capture device configured to obtain images of the interior environment and occupants of the interior environment;
   at least one temperature sensor configured to measure the temperature of the interior environment and at least one temperature sensor configured to measure the temperature of an exterior environment; and
   at least one temperature modification system including
      an image analyzer adapted to analyze a set of images of a set of occupants located in the interior environment captured by the image capture device, the interior environment having a first temperature measured by the at least one temperature sensor configured to measure the temperature of the interior environment;
      a data manager adapted to obtain, interpret, analyze, store and/or initiate storage of data, wherein the data of the data manager includes the set of images from the image capture device; and
      a device manager adapted to issue commands to the at least one conditioning device,
   wherein the at least one temperature modification system is adapted to identify, based on the set of images, a set of occupant characteristics corresponding to the set of occupants, assign a set of temperature ratings corresponding, respectively, to the set of occupant characteristics, and adapted to generate a discrepancy factor by comparing the set of temperature ratings to the temperature of the exterior environment, determining that the discrepancy factor exceeds a threshold, and, in response to the determining that the discrepancy factor exceeds the threshold issuing a command to the at least one conditioning device to modify the first temperature, wherein the set of occupant characteristics comprises a set of clothing classifications corresponding to the set of occupants, and wherein the at least one temperature modification system is adapted to assign a set of temperature ratings to the set of clothing classifications and the discrepancy factor indicates an average of absolute values of differences between each of the set of temperature ratings and the exterior temperature.

7. The system of claim 6, wherein the set of temperature ratings comprises a first temperature rating and a second temperature rating;
   wherein the discrepancy factor is generated by calculating an average of a set of values, the set of values comprising:
      a first difference between the first temperature rating and the exterior second temperature; and
      a second difference between the second temperature rating and the exterior temperature.

8. The system of claim 6, wherein the at least one temperature modification system is adapted to identify, based on the set of images, a set of physical activities of the set of occupants, and adjust a target temperature of the interior environment based on the set of physical activities.

9. The system of claim 8, wherein the set of physical activities is selected from the group consisting of movement, food consumption, and beverage consumption.

10. A computer program product comprising one or more computer readable storage media, and program instructions collectively stored on the one or more computer readable storage media, the program instructions executable by one or more processors to cause the one or more processors to perform a method comprising:
    obtaining a set of images of a set of occupants located in an interior environment;
    measuring a first temperature of the interior environment using one or more devices configured to measure the first temperature;
    identifying, based on the set of images, a set of occupant characteristics corresponding to the set of occupants;
    assigning a set of temperature ratings corresponding, respectively, to the set of occupant characteristics;
    obtaining data about an external environment, including a second temperature;
    generating a discrepancy factor that is a numeric value that indicates an average difference between the set of temperature ratings and the external environment data;
    determining that the discrepancy factor exceeds a threshold; and
    initiating, in response to the determining that the discrepancy factor exceeds the threshold, a modification of the first temperature by issuing a command to a conditioning device to modify the first temperature,
    wherein the identifying the set of occupant characteristics comprises identifying a set of clothing classifications corresponding to the set of occupants, wherein the set of temperature ratings corresponds, respectively, to the set of clothing classifications, and wherein the discrepancy factor indicates an average of absolute values of differences between each of the set of temperature ratings and the second temperature.

11. The computer program product of claim 10, wherein the set of temperature ratings comprises a first temperature rating and a second temperature rating;
    wherein the discrepancy factor is generated by calculating an average of a set of values, the set of values comprising:
       a first difference between the first temperature rating and the second temperature; and
       a second difference between the second temperature rating and the second temperature.

12. The computer program product of claim 10, the method further comprising:
    identifying, based on the set of images, a set of physical activities of the set of occupants; and
    adjusting a target temperature of the interior environment based on the set of physical activities.

13. The computer program product of claim 10, wherein the one or more devices configured to measure the first temperature includes a temperature sensor.

* * * * *